Figure 1:
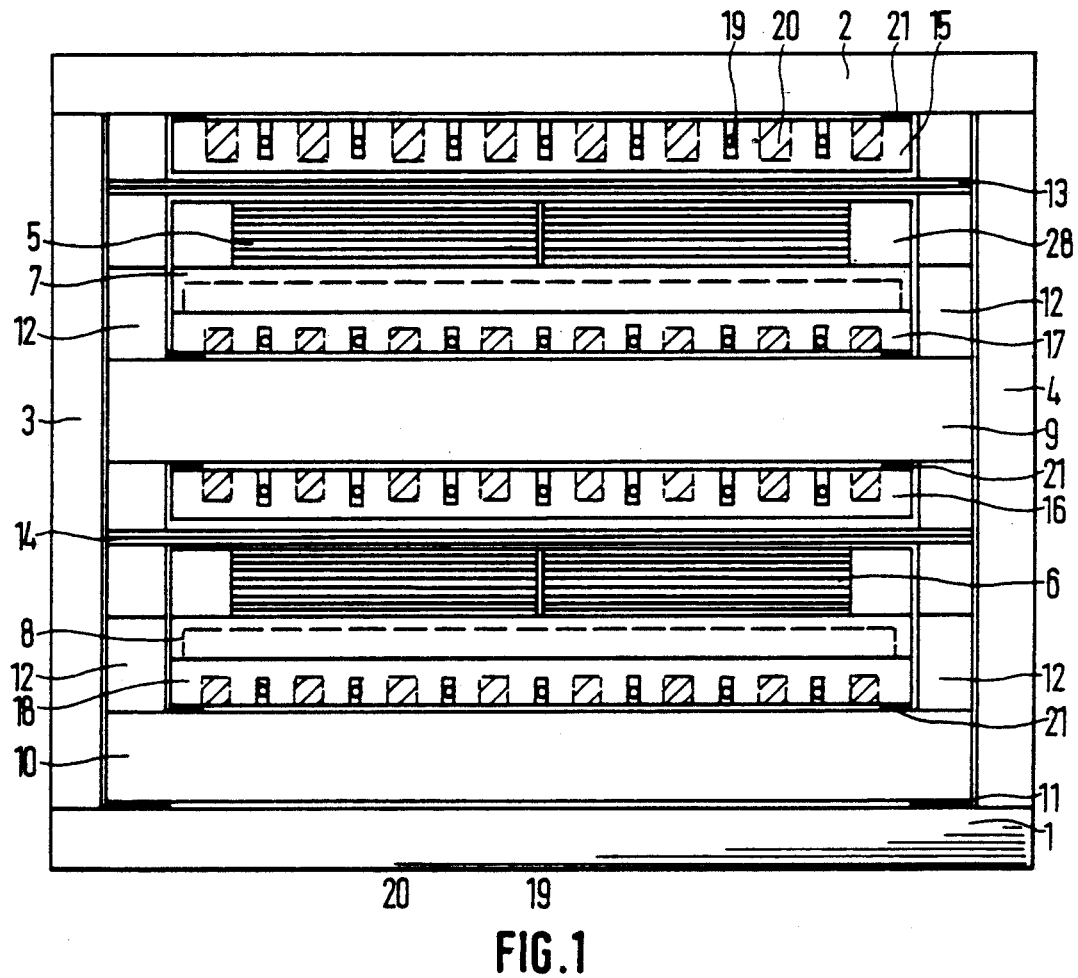

United States Patent [19]

Schneider

[11] Patent Number: 5,069,120
[45] Date of Patent: Dec. 3, 1991

[54] APPARATUS FOR PRESSING MULTILAYER PACKS

[76] Inventor: Klaus Schneider, Stephanstrasse 30, D-1000 Berlin 21, Fed. Rep. of Germany

[21] Appl. No.: 452,514

[22] Filed: Dec. 18, 1989

[30] Foreign Application Priority Data

Dec. 30, 1988 [DE] Fed. Rep. of Germany ....... 3844498

[51] Int. Cl.⁵ .................... B30B 15/34; B30B 7/02
[52] U.S. Cl. .................................. 100/93 P; 100/194
[58] Field of Search .............. 100/90, 93 P, 211, 194

[56] References Cited

U.S. PATENT DOCUMENTS

| | | | |
|---|---|---|---|
| 292,920 | 2/1884 | Kimplen | 100/194 |
| 2,364,597 | 12/1944 | Atwood | 100/93 P X |
| 2,373,770 | 4/1945 | Martin | 100/93 P X |
| 2,420,813 | 5/1947 | Camerota | 100/93 P |
| 2,614,590 | 10/1952 | Hervey | 100/93 P X |
| 2,735,461 | 2/1956 | Pater | 100/93 P X |
| 2,884,033 | 4/1959 | Thurnher | 100/93 P |
| 2,975,476 | 3/1961 | Burke | 100/211 X |
| 2,979,994 | 4/1961 | Welsch | 100/211 X |
| 3,005,402 | 10/1961 | Starger | 100/194 X |
| 3,533,352 | 10/1970 | Miller | 100/211 X |
| 3,550,526 | 12/1970 | Hoover | 100/211 X |
| 3,775,033 | 11/1973 | Pfeiffer | 100/93 P X |
| 3,788,211 | 1/1974 | Mason, Jr. | 100/93 P |
| 3,818,823 | 6/1974 | Bond | 100/211 |
| 3,825,382 | 7/1974 | Davidson | 100/211 X |
| 3,888,719 | 6/1975 | Gibbs et al. | 100/93 P |
| 3,950,210 | 4/1976 | Gibbs et al. | 100/93 P X |
| 3,951,724 | 4/1976 | Johnson et al. | 100/93 P X |
| 3,968,296 | 7/1976 | Nopper et al. | 100/93 P X |
| 4,028,166 | 6/1977 | Leonhart | 100/211 X |
| 4,078,962 | 3/1978 | Krueger | 100/93 P X |
| 4,234,373 | 11/1980 | Reavill et al. | 100/211 X |
| 4,353,416 | 10/1982 | Buschfeld | 100/93 P X |
| 4,421,589 | 12/1983 | Armini et al. | 100/93 P X |

*Primary Examiner*—David T. Fidei
*Assistant Examiner*—Ted Kavanaugh
*Attorney, Agent, or Firm*—Marshall & Melhorn

[57] ABSTRACT

An apparatus for pressing multilayer packs (5,6) by vacuum application and isostatic pressure under heat action is described. The apparatus comprises a pressure-tight chamber with several superimposed stages, in each case intended to receive one multilayer pack. An elastic membrane (13,14) in each stage is used for exerting the necessary pressure on the multilayer pack. In each stage is also provided a plate (9,10) mounted in floating manner as the flatness standard for the multilayer pack and which is exposed to the same pressure on either side during pressing. An upper and lower heating/cooling plate (15 to 18) in each stage ensures a uniform heating of the multilayer packs. The plates mounted in floating manner are thermally insulated with respect to the heating/cooling plates, so that they also remain cool during the heating of the multilayer packs. This excludes a thermally caused distortion of the plates mounted in floating manner.

6 Claims, 1 Drawing Sheet

APPARATUS FOR PRESSING MULTILAYER PACKS

The invention relates to an apparatus for pressing multilayer packs by vacuum application and isostatic pressing under heat action with a plurality of superimposed stages in a pressure-tight chamber and which are in each case intended to receive a multilayer pack, and with an elastic membrane in each stage for exerting the necessary pressure on the multilayer packs.

Multilayer packs have for some time been pressed under a vacuum, i.e. before or during the pressing process a vacuum is applied to the edge of the packs for the suction removal of air enclosed between the individual layers. Numerous variants exist for the performance of this process, e.g. hydraulic pressing with a vacuum chamber or the autoclave method with evacuated film coverings for the multi-layer packs and the use of an inert gas as the pressure and heating medium. EP 0 254 901 A2 discloses a fluid press with a flexible membrane on all sides, which completely surrounds a multilayer pack. After producing a vacuum inside and outside the membrane, outside the latter a hot fluid is supplied and pressurized, so that the membrane tightly encloses the pack. During the subsequent pressing operation, the fluid serves as the pressure and heating medium.

The known apparatuses suffer from the disadvantage that they either do not allow the pressing of several superimposed multilayer packs, or it is not possible for superimposed packs to create a flatness standard such that a uniform pressing over the entire pack surface is ensured. Thus, if it is only possible to press in one plane, the known apparatuses operate in a time and energy consuming manner, or if several packs are pressed in superimposed manner they do not operate accurately enough for providing completely satisfactory multilayer packs with respect to the flatness or planeness.

The object of the present invention is therefore to provide an apparatus for pressing multilayer packs by vacuum application and isostatic pressing under heat action with several stages superimposed in a pressure-tight chamber and which are in each case intended for receiving a multilayer pack, and with an elastic membrane in each stage for exerting the necessary pressure on the multilayer pack and in which, despite the necessary high contact pressures, a completely planar or flat pressing in each of the individual stages is ensured.

According to the invention the problem is solved by the features of an apparatus for pressing multilayer packs by vacuum application and isostatic pressing under heat action with a plurality of superimposed stages in a pressure-tight chamber and which are in each case intended to receive a multilayer pack, and with an elastic membrane in each stage for exerting the necessary pressure on the multilayer packs, characterized in that in each stage is provided a plate mounted in floating manner as the flatness standard for the multilayer pack, which is exposed to the same pressure on either side during pressing. Advantageous further developments of the inventive apparatus can be gathered from the subclaims.

The invention is characterized in that in each stage is provided a plate mounted in floating manner as the flatness standard for the multilayer pack and which is exposed to the same pressure on either side during pressing. The plate mounted in floating manner can consequently not bend during pressing and as the multilayer pack adapts to the plate mounted in floating manner, optionally via flexible intermediate plates, it remains or becomes completely flat.

The elastic membrane or diaphragm is advantageously constructed as a bag fixed in a horizontal plane along the chamber walls and which, placed under an internal pressure, acts downwards and upwards against a plate mounted in floating manner. This ensures that the membrane exerts a uniform pressure on each plate and a plate located between two membranes is exposed from above and below to the same pressure during pressing, i.e. is mounted in force-free manner.

Preferably above and below the multilayer pack, each stage has a heating/cooling plate. Thus, heat can be supplied uniformly from above and below to the pack. The plates mounted in floating manner are appropriately thermally insulated with respect to the heating/cooling plates. Thus, even during the heating of the multilayer pack, the plates remain cool, so that there is no thermally caused bending of the plates.

A vacuum can be used in the chamber for the suction removal of air enclosed between the layers of the multilayer pack. By pressure-tight seals all round, in each case in the marginal area between the plates mounted in floating manner and the adjacent surfaces, it is possible to blow cooling air through the gap between the plates and e.g. adjacent heating/cooling plates, without impairing the vacuum in the chamber.

The invention is described in greater detail hereinafter relative to a non-limitative embodiment and the attached drawings, wherein show:

FIG. 1 a vertical section through a chamber between its side walls for the pressing of multilayer packs.

Figure 2:
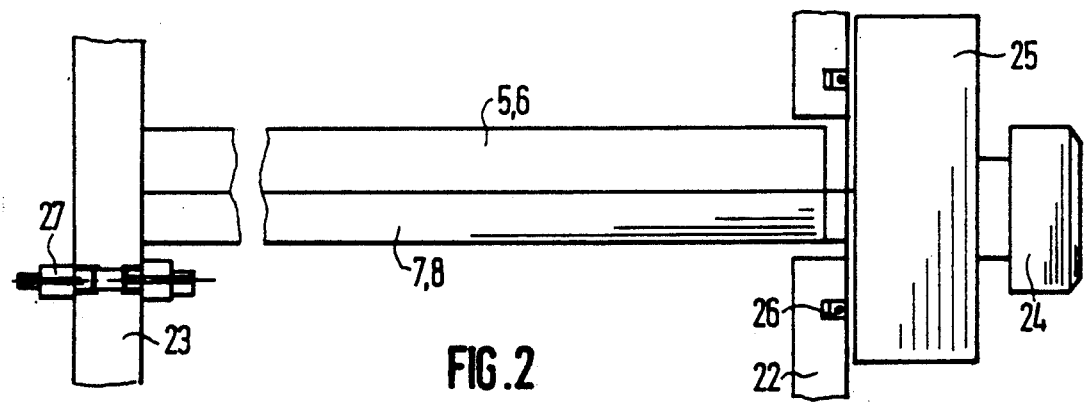

FIG. 2 a vertical section through part of the chamber according to FIG. 1 between the front and back.

According to FIG. 1, the pressure-tight chamber has a base 1, a top 2, and two side walls 3 and 4. In particular the base 1 and top 2 are provided with ribs, in order to increase the compression strength.

The represented chamber comprises two stages and is used for receiving two multilayer packs 5,6, which are in each case placed on a thin aluminium platen 7,8. The platens 7 and 8 contain pocket-like recesses and are therefore extremely flexible and light. The multilayer pack and the associated platen are inserted as a unit into the chamber and removed again following pressing.

Each stage has a solid aluminium pressure plate 9 or 10 mounted in floating manner and which is in particular ground flat and represents the flatness standard for the pressing process in the particular stage. Via an all-round, pressure-tight marginal seal 11, the lower pressure plate 10 rests on base 1 and via spacers 12, the upper pressure plate 9 rests on the pressure plate 10.

A membrane 13 or 14 in the form of a rubber bag is also placed in each stage and has a sealing and gripping frame fixed between spacers 12. Within membrane 13,14 a contact pressure can be built up by the compressed air, so that it also possibly expands vertically and both upwards and downwards exerts a uniform pressure on the adjacent surfaces.

Finally, each stage contains a upper heating/cooling plate 15 or 16 and a lower heating/cooling plate 17 or 18. These plates are made from aluminium and as a result of recessing have a limited weight and can easily be bent. They are provided with slots 19 into which can be inserted and then cast heating and resistance wires for temperature measurement purposes. In further recesses of the heating/ cooling plates are bonded Teflon ®(duPont)) spacers 20, which act in a thermally insulating manner and create a gap between a heating-/cooling plate and the adjacent pressure plate 9,10 or the top 2. This gap is sealed in air-tight manner with respect to the remaining chamber interior by all round seals 21.

From bottom to top the construction of a stage is pressure plate 9 or 10, lower heating/cooling plate 17 or 18, platen 7 or 8, multilayer pack 5 or 6, membrane 13 or 14 and upper heating/cooling plate 15 or 16. The pressure plate of the bottom stage is located on the base 1 and the heating/ cooling plate of the top stage is adjacent to top 2.

FIG. 2 shows a vertical partial section turned by 90° compared with FIG. 1 through a stage with part of the chamber front wall 22 and rear wall 23. In each stage the front wall 22 has an opening, through which can be inserted into the chamber the unit comprising platen 7,8 and multilayer pack 5,6. The opening is then closed by a door 25 provided with a grip 24. A seal 26 surrounding the opening ensures an airtight closure if the door 25 is made tight by the vacuum produced in the interior of the chamber. Pipe ducts 27 in the rear wall 23 are used for producing the vacuum in the chamber, for supplying compressed air for pressing purposes and for supplying cooling air.

The apparatus functions as follows. Outside the unit the units formed by the platen and the multilayer pack are prepared. The platens contain precise holes for registering pins for different sizes. Normally several multilayer packs are juxtaposed on each platen. Unoccupied areas are filled with aluminium strip shabrack 28, so as to balance different pack thicknesses. Even if no multilayer packs are to be pressed in a particular stage, shabrack of corresponding surface area and thickness be placed on the particular platen, so that the associated pressure plate remains free from forces. Thus, a pack of the same surface area and thickness must be located on each platen.

The units are then inserted and the doors 25 brought infront of the openings in the front wall 22. A vacuum is then produced in the chamber so as to tightly close the doors 25. The vacuum is also formed in the gaps between the heating/cooling plate and the adjacent pressure plates or top, so that the thermal insulation between them is improved during the heating phase. This is followed by brief heating and the exertion of a pressure via the membrane, so that in conjunction with the vacuum in the chamber the air is completely sucked out of the multilayer packs.

This is followed by a controlled, uniform heating of the multilayer packs to the maximum temperature and the building up of the contact pressure in the membranes. The pressure plates remain cool. For force compensation purposes on the bottom pressure plate, the contact pressure is also produced in the gap between said pressure plate and the base.

After ending the heating cycle compressed air is blown for cooling purposes into the gap between the heating/ cooling plates and the pressure plates or top, sealing with respect to the remaining chamber interior being ensured, so that the vacuum there is not impaired. Cooling is carried out in a controlled manner and the vacuum disconnected at the end thereof. The pressed multilayer packs with all their platens can then be removed from the chamber.

As stated, the apparatus can also have more than two stages. In this case a further pressure plates is located over the heating/cooling plate 15 and on said pressure plate is formed the next stage, on which is optionally placed a further pressure plate and so on.

The present apparatus offers the following advantages. There is a minimum distortion of the pressed multilayer packs, because the pressure plates as the flatness standard remain free from forces and cool during pressing. Due to the limited weight of the parts to be heated, the energy costs for heating and cooling are low. As a result of the construction of several stages, it is possible to increase the capacity for the same heating and cooling capacity and the same control expenditure. The individual stages have a modular construction, so that the construction of the apparatus is very simple and easy to maintain. The pressure and cooling medium can be normal compressed air, i.e. no complicated hydraulics are required. A heat treatment under vacuum without pressurizing the multilayer packs is also possible.

I claim:

1. Apparatus for pressing multilayer packs by vacuum application and isotactic heat action with a plurality of superimposed stages in a pressure-type chamber, the chamber having sidewalls, means for applying a vacuum in the chamber, a multi-layer pack in each stage, means for heating each pack, means for cooling each pack, an elastic membrane means in each stage for exerting pressure on the pack, a bottom plate in each stage mounted in a floating manner in which the plate is not fixed to the sidewalls of the chamber, the plate being the flatness standard for the pack and the plate being exposed to the same pressure on either side during pressing, the means for heating the pack and the means for cooling the pack including an upper heating/cooling plate located above and a lower heating/cooling plate located below the pack in each stage, and each bottom plate being thermally insulated against the lower heating/cooling plate, the bottom plate remaining cool when the pack is heated and pressed.

2. An apparatus as defined in claim 1 in which the thermal action of each of the heating/cooling plates in a stage is about the same magnitude.

3. An apparatus as defined in claim 1 in which pressure tight seals are provided in the marginal area between the bottom plate and the adjacent surfaces.

4. An apparatus as defined in claim 1 in which the bottom plate of the next stage above is located above the upper heating/cooling plate of the stage below, the bottom plate of the next stage also being thermally insulated from the upper heating/cooling plate as well as from the heating/cooling plates in its respective stage.

5. An apparatus as defined in claim 1 in which the bottom plate is kept in its spacing in the stage by spacers located above the bottom plate at each end thereof.

6. An apparatus as defined in claim 1 in which the heating/cooling plates are provided with slots for receiving heating wires and resistance wires for temperature measurement.

* * * * *